United States Patent
Yeh

(10) Patent No.: US 10,015,058 B2
(45) Date of Patent: Jul. 3, 2018

(54) RELIABILITY EVALUATION SYSTEM FOR MULTI-STATE FLOW NETWORK AND METHOD THEREOF

(71) Applicant: NATIONAL TSING HUA UNIVERSITY, Hsinchu (TW)

(72) Inventor: Wei-Chang Yeh, Hsinchu (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 546 days.

(21) Appl. No.: 14/620,379

(22) Filed: Feb. 12, 2015

(65) Prior Publication Data

US 2016/0112273 A1 Apr. 21, 2016

(51) Int. Cl.
*H04L 12/24* (2006.01)

(52) U.S. Cl.
CPC .......... *H04L 41/142* (2013.01); *H04L 41/147* (2013.01)

(58) Field of Classification Search
CPC .................................................. H04L 41/142
See application file for complete search history.

(56) References Cited

U.S. PATENT DOCUMENTS

2014/0160927 A1* 6/2014 Majumdar .............. H04L 47/10
370/235

* cited by examiner

*Primary Examiner* — Suraj Joshi
(74) *Attorney, Agent, or Firm* — Amin, Turocy & Watson LLP

(57) ABSTRACT

Disclosed are a reliability evaluation system for multi-state flow network and a method thereof. The system includes an element-gaining module and a reliability calculation module. The method includes using a GCF calculating means to calculate an initial reliability according a first and second system-state vector, comparing values of all elements in a set being composed of elements of a second grade of a third system-state vector, excluding an element with a greater value and other related thereof in all grades in the third system-state vector when only one element in the set except the element with greater values so as to obtain remaining elements, using the GCF calculating means to perform the calculation of the remaining element to obtain a calculation results, and summing the initial reliability and the calculation results so as to obtain a reliability of the multi-state flow network.

10 Claims, 4 Drawing Sheets

RELIABILITY EVALUATION SYSTEM FOR MULTI-STATE FLOW NETWORK AND METHOD THEREOF

TECHNICAL FIELD

This present invention relates to reliability evaluation techniques, and, more specifically, relates to a reliability evaluation system for a multi-state flow network and a method thereof.

BACKGROUND

In recent years, the multi-state flow network (MFN) is widely used to simulate the systems in real world, such as computer network, supply chain system and power grid or transportation network. Therefore, the multi-state flow network is important for the current application and research and also attracts a broad attention of many researchers.

Reliability is one of the important indices for evaluating the performance of MFN. The definition of the reliability of the multi-state flow network generally is the probability of successfully transferring a required amount of flow, d, from the source node to the reception node. Please refer to FIG. 1, the connected graph, G(V, E, W), shown in FIG. 1 is used for describe the multi-state flow network, comprising a node set V={1, 2, ..., n}, an arc set E={$e_1, e_2, ..., e_m$}, and a vector set W=($w_1, w_2, ..., w_m$) which indicates the max-capacity of each arc, wherein 1 denotes the source node, n denotes the reception nodes (n equals to the number of the nodes). Using FIG. 1 as an example, there are four nodes in a multi-state flow network, which are the source node ①, the reception node ④, the connection nodes ② and ③, respectively. The arc $e_1$ connects the source node ① to the connection node ② and its max-capacity is 3. The arc $e_6$ connects the connection node ③ to the reception node ④ and its max-capacity is 2. In other cases, this will not repeat them, and so on.

It can be known from FIG. 1, for a multi-state flow network, there are many paths of transferring a required amount of flow from the source node ①, through the connection nodes ② and ③, to the reception node ④. Each path can be represented by a system-state vector d-MP, for example, 3-MP represents the given flow upper limit as 3 of the multi-state flow network transferring from the source node ① to the reception node ④. All the d-MP of the multi-state flow network are denoted by $P_1, P_2, ..., P_n$. In addition, each node follows the flow conservation law, i.e., the received amount of flow must equal to the output amount of flow.

Accordingly, the current technique proposed the sum of disjoint products (SDP) technique to calculate the reliability of a multi-state flow network. Suppose that the multi-state flow network is 3-MP, and has three system-state vectors, which means that, in the multi-state flow network, there are three states being able to successfully transfer amount of flow of 3 from the source node to the reception node, for example, $P_1$=(3,2,1,0,0,1), $P_2$=(2,2,0,0,1,1), and $P_3$=(2,1,1,0,1,2). In the system-state vector $P_1$, 3 units amount of flow can be transferred from the source node ① to the connection node ②, units amount of flow can be transferred from the connection node ② to the reception node ④, unit amount of flow can be transferred from the connection node ② to the connection node ③, the amount of flow from the connection node ③ to the connection node ② as well as the source node ① to the connection node ③ are both zero, and the connection node ③ transfers 1 unit amount of flow to the reception node ④. So on for the system-state vectors $P_2$ and $P_3$, this will not repeat them.

Refer to the following Table 1, for example. In the system-state vector $P_1$, the probability of that the source node ① transfers 3 units amount of flow to the connection node ② is 0.6, the probability of that the connection node ② transfers 2 units amount of flow to the reception node ④ is 0.6, the probability of that 1 unit amount of flow transferred from the connection node ② to the connection node ③ is 0.9, the probability of that the connection node ③ transfers 0 unit amount of flow to the connection node ② is 0.1+0.9, the probability of that the source node ① transfers 0 unit amount of flow to the connection node ③ is 0.1+0.9, and the probability of the connection node ③ transfers 1 unit amount of flow to the reception node ④ is 0.7+0.25. So on for the system-state vectors $P_2$ and $P_3$, this will not repeat them.

TABLE 1

| capacity, j | component, i $Pr(\{X(e_i) = x|x = j\})$ | | | | | |
|---|---|---|---|---|---|---|
| | 1 | 2 | 3 | 4 | 5 | 6 |
| 0 | .05 | .10 | .10 | .10 | .10 | .05 |
| 1 | .10 | .30 | .90 | .90 | .90 | .25 |
| 2 | .25 | .60 | | | | .70 |
| 3 | .60 | | | | | |

The following is the procedure of reliability calculation of the multi-state flow network by SDP technique.

STEP 1.

Let $i = 3$ $$R_d = Pr(P_1) + [Pr(P_2) - Pr(P_{21})]$$
$$= Pr(3, 2, 1, 0, 0, 1) + [Pr(2, 2, 0, 0, 1, 1) - Pr(3, 2, 1, 0, 1, 1)]$$
$$= .46683,$$

where, $$Pr(P_1) = Pr(\{X | P_1 = (3, 2, 1, 0, 0, 1) \le X\}$$
$$= p_{13} \cdot p_{22} \cdot p_{31} \cdot p_{40} \cdot p_{50} \cdot p_{61}$$
$$= (.6) \cdot (.6) \cdot (.9) \cdot (.1 + .9) \cdot (.1 + .9) \cdot (.25 + .7)$$
$$= .3078,$$

$$Pr(P_2) = (.25 + .6) \cdot .6 \cdot (.1 + .9) \cdot (.1 + .9) \cdot .9 \cdot (.25 + .7) = .43605,$$

$$P_{21} = (P_1 \cap P_2)$$
$$= (3, 2, 1, 0, 0, 1) \cap (2, 2, 0, 0, 1, 1)$$
$$= (\text{Max}\{3, 2\}, \text{Max}\{2, 2\}, \text{Max}\{1, 0\}\text{Max}\{0, 0\}, \text{Max}\{0, 1\}, \text{Max}\{1, 1\})$$
$$= (3, 2, 1, 0, 1, 1),$$

$$Pr(P_{21}) = .6 \cdot .6 \cdot .9 \cdot (.1 + .9) \cdot .9 \cdot (.25 + .7) = .27702.$$

STEP2.

$j=2$, $D_{31}=\{P_3=(2,1,1,0,1,2)\}$, and $D_{32}=\{P_{31}=(3,2,1,0,1,2), P_{32}=(2,2,1,0,1,2)\}$.

STEP 3.

Because $P_{31}$ and $P_32$ are correlated (called sibling vectors), the procedure moves toward STEP4.

STEP 4.

Let $j = 2 + 1 = 3$,

-continued $$D_{33} = \{\text{Intersection of } P_{31} \text{ and } P_{32} \text{ in } D_{32}\}$$
$$= \{P_{31} \cap P_{32}\}$$
$$= \{P_{321} = (3, 2, 1, 0, 1, 2)\},$$

Move toward STEP 3 again.

STEP 3.

Because there is no correlated vectors in $D_{33}$, the procedure moves toward STEP 5.

STEP 5.

Let $$R_d = R_d + Pr(D_3)$$
$$= .411683 + [Pr(P_3) - Pr(P_{31}) - Pr(P_{32}) + Pr(P_{321})]$$
$$= .411683 + [Pr(2, 1, 1, 0, 1, 2) - Pr(3, 2, 1, 0, 1, 2) -$$
$$Pr(2, 2, 1, 0, 1, 2) + Pr(3, 2, 1, 0, 1, 2)]$$
$$= .611415.$$

STEP 6.

i=3 equals to the number of all the system-state vectors, so the procedure is stopped.

From the above procedure, it is very complex to calculate the reliability of the multi-state flow network by SDP technique. It requires many summation and multiplication procedures and results in a long calculation time. Therefore, how to reduce the summation and multiplication procedures for calculating the reliability of the multi-state flow network, so as to improve the calculation performance is to present the anxious issues to be solved.

SUMMARY

Given the shortcomings of the above prior technique, the present invention provides a reliability evaluation system for a multi-state flow network. The multi-state flow network comprises a source node, a reception node, at least one connection node between the source node and the reception node, and a plurality of paths having a given flow upper limit from the source node, through the connection node, to the reception node. The reliability evaluation system comprises: a definition module defining each of the plurality of paths as a system state vector, each of the system state vector having at least one grade, each of the grade having at least one element, so as to define all the elements in the $j^{th}$ grade of the $i_{th}$ stem state vector as a set, wherein j is i–1; a element-gaining module comparing the values of all the elements in the set, excluding the element with a greater value and other related thereof in all grades in the $i^{th}$ system-state vector when only one element in the set except the element with the greater value so as to obtain remaining elements, or, when only one element is in the set, letting the element to be the remaining element; and a reliability calculation module using a GCF calculating means to calculate initial reliability based on a first system-state vector and a second system-state vector of the plurality of paths, and using the GCF calculating means to perform the calculation of the remaining element to obtain calculation results, and summing the initial reliability and the calculation results so as to obtain a reliability of the multi-state flow network.

The present invention further provides a reliability evaluation method for a multi-state flow network. The multi-state flow network comprises a source node, a reception node, at least one connection node between the source node and the reception node, and a plurality of paths having a given flow upper limit from the source node, through the connection node, to the reception node. The reliability evaluation method comprises the following steps of: defining each of the plurality of paths as a system state vector, and using a GCF calculating means to calculate initial reliability based on a first system-state vector and a second system-state vector of the plurality of paths; each of the system state vector having at least one grade, each of the grade having at least one element, so as to define all the elements in the $j^{th}$ grade of the $i^{th}$ system state vector as a set, wherein j is i–1; comparing values of all the elements in the set; excluding the element with a greater value and other related thereof in all grades in the $i^{th}$ system-state vector when only one element in the set except the element with the greater value so as to obtain remaining elements, or, when only one element is in the set, letting the element to be the remaining element; and using the GCF calculating means to perform the calculation of the remaining element to obtain a calculation results, and summing the initial reliability and the calculation results so as to obtain reliability of the multi-state flow network.

Compared with the prior technique, the present invention employs the concept of GCF and the technique of excluding the element with a greater value and other related thereof in calculation, which can significantly reduce the complexity of summation and multiplication in the past, so as to improve the performance of reliability calculation.

DETAILED DESCRIPTION

The detail description of the disclosure is described by specific embodiments in the following. Those with ordinary skills in the arts can readily understand the advantages and functions according to the present invention after reading the disclosure of this specification.

Figure 1:
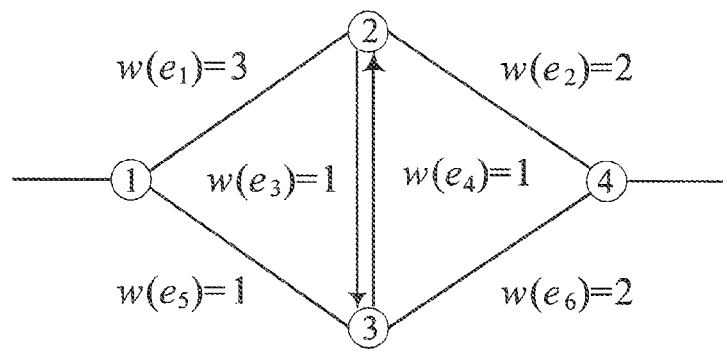
FIG. 1 is an example of connected graph of the multi-state flow network according to the present invention.
Figure 2:
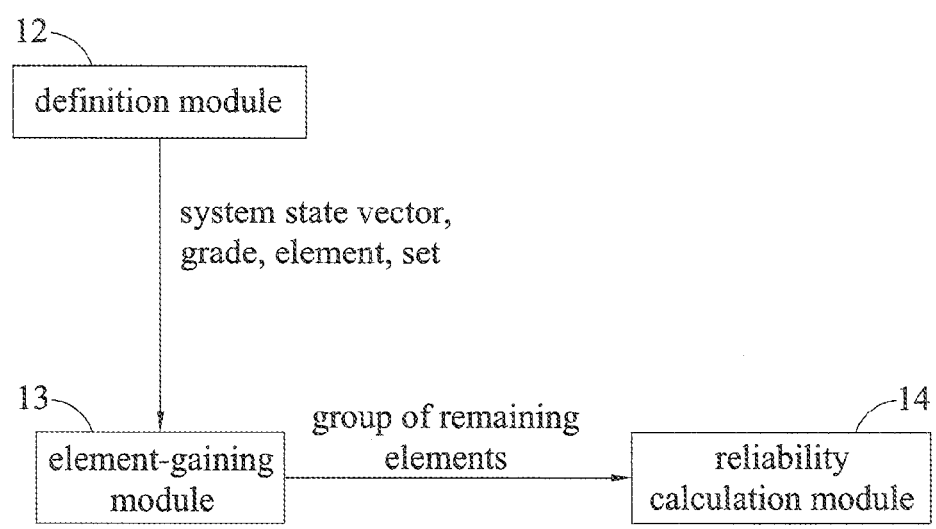
FIG. 2 is a structure block diagram of the reliability evaluation system for a multi-state flow network according to the present invention.

Referring to FIG. 2, the reliability evaluation system according to the present invention is used for a multi-state flow network. The multi-state flow network comprises a source node, a reception node, at least one connection node between the source node and the reception node, and a plurality of paths having a given flow upper limit from the source node, through the connection node, to the reception node. The connections between the source node and reception node to the connection nodes, respectively, and the connections between each other of the plurality of connection nodes are defined as arc, which can be referred to FIG. 1. What is needed to further describe is that, in the reliability evaluation system for a multi-state flow network according to the present invention, the amount of flow in the plurality of paths and in of each arc of the plurality of paths, and the probability of transferring that amount of flow in each arc can be calculated by various means.

The reliability evaluation system according to the present invention includes a definition module 12, an element-gaining module 13, and a reliability calculation module 14.

The definition module 12 defines each of the plurality of paths as a system state vector $P_i$. Each of the system state vector has at least one grade and each of the grade has at least one element, so there is multiple elements in all the grades of a system state vector. All the elements in the $j^{th}$ grade of the $i^{th}$ system state vector are defined as a set $D_{ij}=\{P_{i1}, P_{i2}, \ldots, P_{i,i-1}\}$, wherein j is i−1, for example, i equals to 3, and j equals to 2.

The element-gaining module 13 compares the values of all the elements in the set $D_1$, so as to exclude the element with a greater value and other related thereof in all grades in the $i^{th}$ system-state vector when only one element in the set $D_{ij}$ except the element with the greater value to obtain remaining elements, or, when only one element is in the set, lets the element to be the remaining element. Next, i denotes the group that the element with the greater value and other related thereof in all grades in the $i^{th}$ system-state vector are excluded and the remaining elements are kept. When only one element is in the set, $\Delta_i$ merely includes the only one element.

In addition, when the element with the greater value is unable to be obtained from the set $D_{ij}$, the definition module 12 modifies the definition of the set $D_{ij}$ to all the elements in the $j+1^{th}$ grade of the $i^{th}$ system state vector, i.e., $D_{ij+1}$, and then let the element-gaining module 13 compares the values of all the elements in the set $D_{ij+1}$.

The reliability calculation module 14 uses a GCF calculating means to calculate an initial reliability $R_d$, based on a first system-state vector $P_1$ and a second system-state vector $P_2$ of the plurality of paths, and uses the GCF calculating means to perform the calculation of the remaining element (i.e., the group $\Delta_i$) to obtain a probability result $Pr(\Delta_i)$, so as to sum the initial reliability $R_d$ and the probability results $Pr(\Delta_i)$ to obtain a reliability of the multi-state flow network $R_d=R_d+Pr(\Delta_i)$. Moreover, when i is less than the number of the plurality of paths, the definition module 12 replaces i to i+1 and modifies definition of the set to all the elements in the $j^{th}$ grade of the i+1$^{th}$ system state vector, i.e., $D_{i+1j}$, and then let the element-gaining module 13 to compare the values of all the elements in the set $D_{i+1j}$.

Moreover, the procedure of the reliability calculation module 14 obtaining the probability result is to calculate the probability of the first system state vector $Pr(P_1)$, and to calculate the result of probability of the second system state vector minus probability of the intersection of the first system state vector and the second system state vector by the great common factor (GCF) calculating means, so as to obtain an initial calculation result $[Pr(P_2)-Pr(P_{21})]$, and then obtains the initial reliability $R_d=Pr(P_1)+[Pr(P_2)-Pr(P_{21})]$ by summing the probability of the first system state vector and the initial calculation result.

Figure 3:
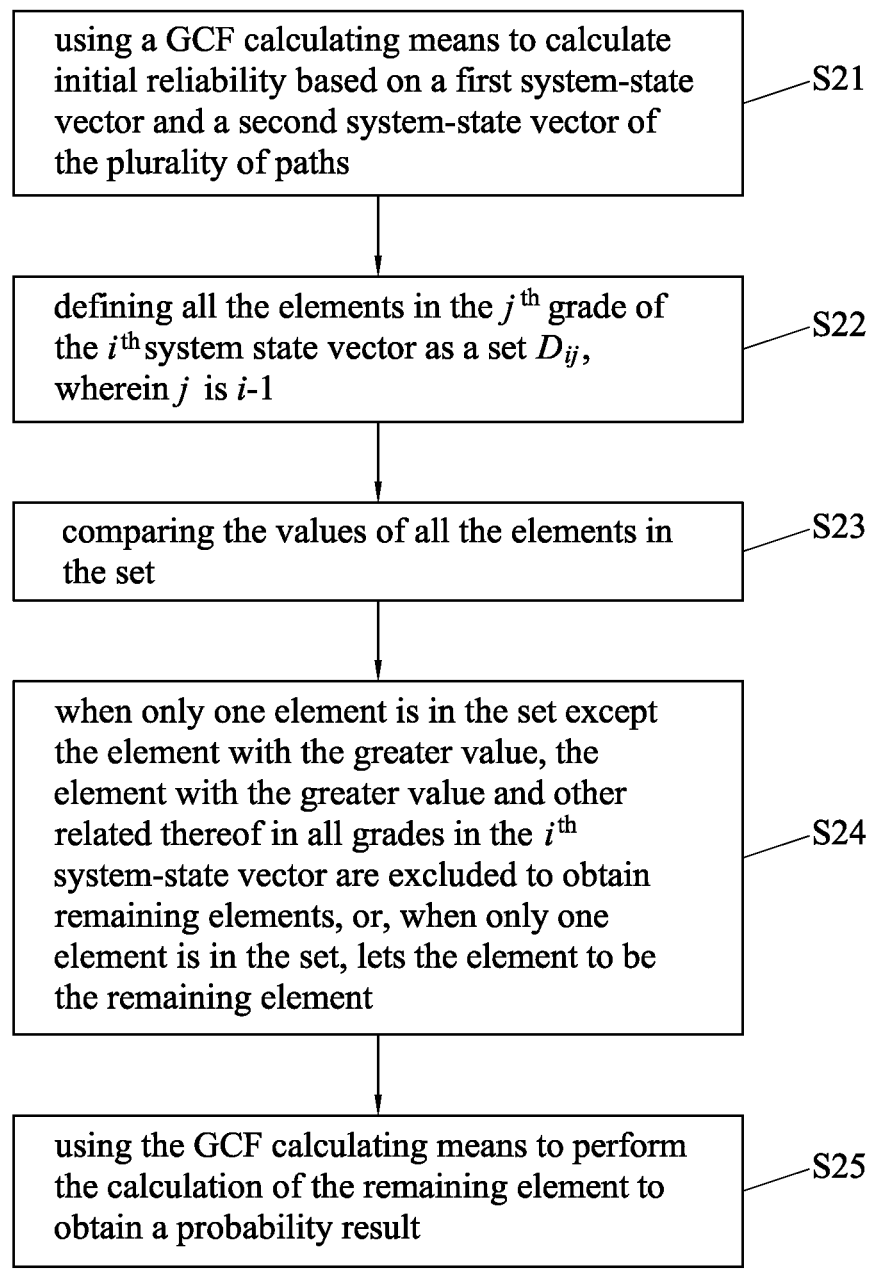
FIG. 3 is a flow chart of the reliability evaluation method for multi-state flow network according to the present invention.

The reliability evaluation method for a multi-state flow network according to the present invention is described according to FIG. 3. The multi-state flow network comprises a source node, a reception node, at least one connection node between the source node and the reception node, and a plurality of paths having a given flow upper limit from the source node, through the connection node, to the reception node. The connections between the source node and reception node to the connection nodes, respectively, and the connections between each other of the plurality of connection nodes are defined as arc, which can be referred to FIG.

1. What is needed to further describe is that, in the reliability evaluation system for multi-state flow network according to the present invention, the amount of flow in the plurality of paths and in of each arc of the plurality of paths, and the probability of transferring that amount of flow in each arc can be calculated by various means.

Firstly, each of the plurality of paths is defined as a system state vector $P_i$. Each of the system state vector has at least one grade and each of the grade has at least one element, so there is multiple elements in all the grades of a system state vector. All the elements in the $j^{th}$ grade of the $i^{th}$ system state vector are defined as a set $D_{ij}=\{P_{i1}, P_{i2}, \ldots, P_{i,i-1}\}$, wherein j is i−1, for example, i equals to 3, and j equals to 2.

In step S21, using a GCF calculating means calculates an initial reliability $R_d$ based on a first system-state vector $P_1$ and a second system-state vector $P_2$ of the plurality of paths. More specifically, it is to calculate the probability of the first system state vector $Pr(P_1)$, and to calculate the result of probability of the second system state vector minus probability of the intersection of the first system state vector and the second system state vector by the GCF calculating means, so as to obtain an initial calculation result $[Pr(P_2)-Pr(P_{21})]$, and then obtains the initial reliability $R_d=Pr(P_1)+[Pr(P_2)-Pr(P_{21})]$ by summing the probability of the first system state vector and the initial calculation result. The GCF calculating means is shown in the following STEP 1. Next, move toward the step S22.

In the step S22, all the elements in the $i^{th}$ grade of the $i^{th}$ system state vector are defined as a set $D_{ij}$, wherein j is i−1. Then, move toward the step S23.

In the step S23, the values of all the elements in the set $D_{ij}$ are compared. Next, move toward the step S24.

In the step S24, when only one element in the set $D_{ij}$ except the element with the greater value, the element with the greater value and other related thereof in all grades in the $i^{th}$ system-state vector are excluded to obtain remaining elements, or, when only one element is in the set, lets the element to be the remaining element. Next, $_i$ denotes the group that the element with the greater value and other related thereof in all grades in the $i^{th}$ system-state vector are excluded and the remaining elements are kept. When only one element is in the set, $_i$ merely includes the only one element. Then, move toward the step S25.

In the step S25, the GCF calculating means is used to perform the calculation of the remaining element (i.e., the group $\Delta_i$) to obtain a probability result $Pr(\Delta_i)$. The initial reliability $R_d$ and the probability results $Pr(\Delta_i)$ are summed to obtain a reliability of the multi-state flow network $R_d=R_d+Pr(\Delta_i)$. More specifically, when i=3, the GCF calculating means is used to calculate the result of probability $Pr(\Delta_3)$ of the third system state vector minus probability of the intersection of the first system state vector and the third system state vector. The GCF calculating means is shown in the following STEP 6.

FIG. 3 shows the situation that the number of all the system-state vectors of the i=3 multi-state flow network and only one element in the set $D_{ij}$ except the element with greater values or only one element in the set, after comparing the values of all the elements in the set.

Figure 4:
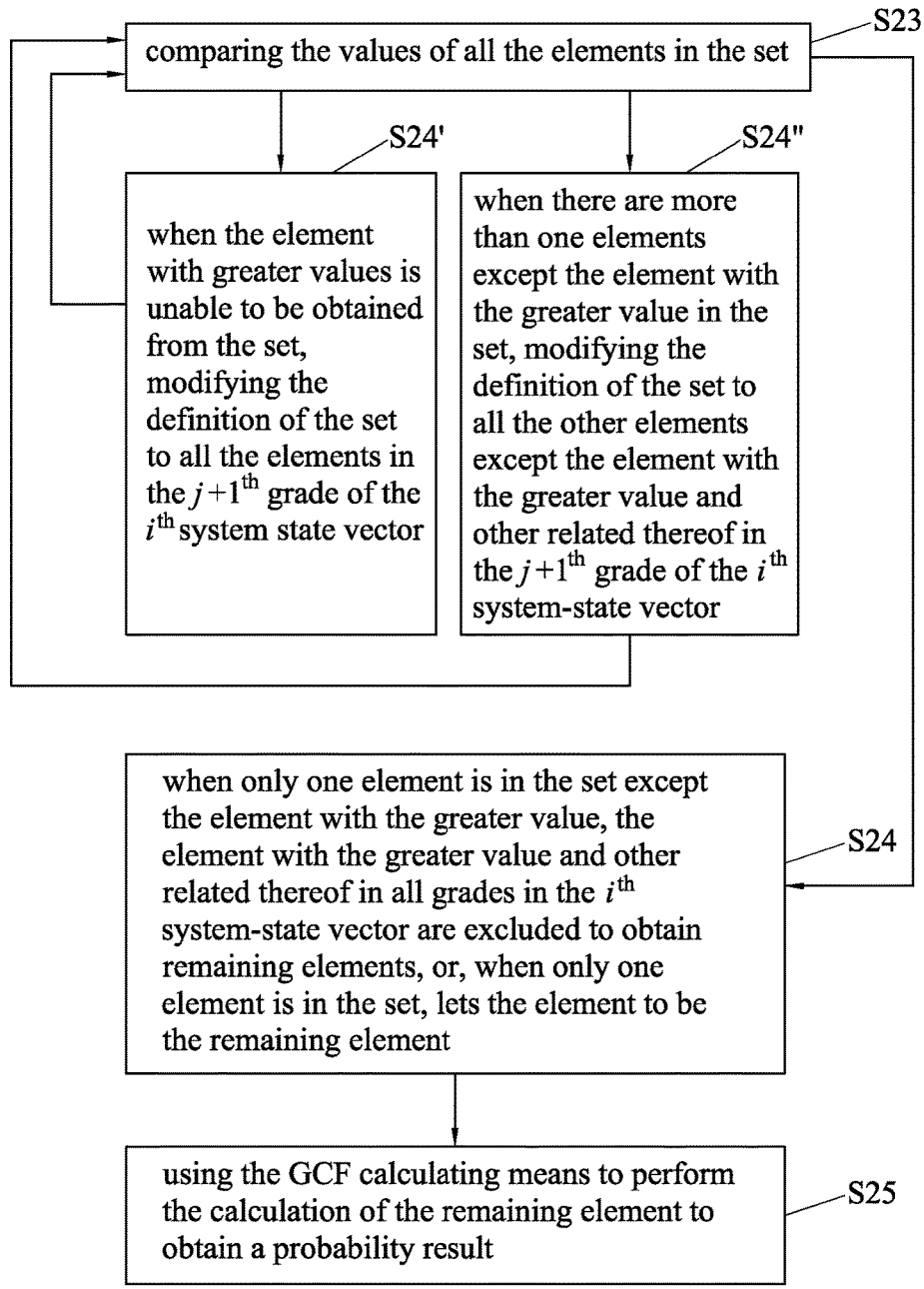
FIG. 4 is a flow chart of the reliability evaluation method for a multi-state flow network according to an embodiment.

Please refer to FIG. 4 for other situations. In step S24', when the element with greater values is unable to be obtained from the set, the definition of the set is modified to all the elements in the j+1$^{th}$ grade of the system state vector, and then back to the step S23.

In step S24", when there are more than one elements except the element with greater values in the set, the definition of the set is modified to all the other elements except the element with greater values and other related thereof in the j+1$^{th}$ grade of the i$^{th}$ system-state vector, and then back to the step S23.

Figure 5:
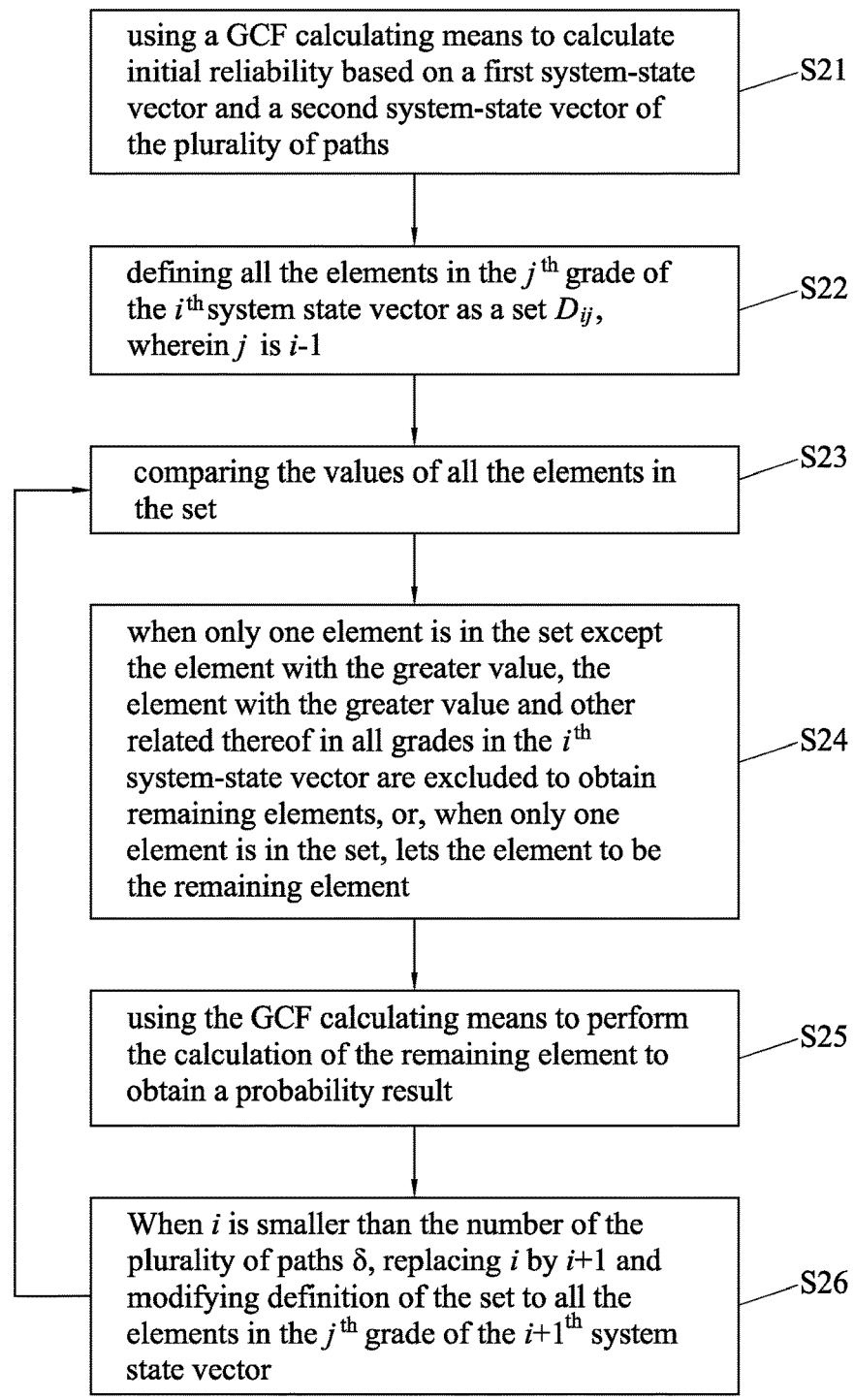
FIG. 5 is a flow chart of the reliability evaluation method for a multi-state flow network according to another embodiment.

In addition, if the number of all the system-state vectors of the multi-state flow network is not i=3, refer to FIG. 5. After executing the aforementioned step S21 to S25, move toward step S26. When i is smaller than the number of the plurality of paths δ, i is replaced by i+1 and definition of the set is modified to all the elements in the j$^{th}$ grade of the i+1$^{th}$ system state vector, and then going back to step S23 to step S25, another probability result is calculated. Then, the reliability of the multi-state flow network is the summation of the initial reliability, the calculation result and the another calculation result.

The following mathematical formulas, for example, describe the above evaluation method (including the GCF calculating means). To be further described is that Table 2 is the accumulative probability of Table 1, and Table 3 describes the elements in each grade j of the i$^{th}$ system-state vector.

TABLE 2

| capacity j | component i $p_{ij} = Pr(\{X(e_i) = x \| x \geq j\})$ | | | | | |
|---|---|---|---|---|---|---|
| | 1 | 2 | 3 | 4 | 5 | 6 |
| 0 | 1 | 1 | 1 | 1 | 1 | 1 |
| 1 | .9 | .9 | .9 | .9 | .9 | .95 |
| 2 | .85 | .6 | | | | .7 |
| 3 | .6 | | | | | |

TABLE 3

| j | 1 | 2 | 3 | 4 | | | 5 | | | | | |
|---|---|---|---|---|---|---|---|---|---|---|---|---|
| 1 | $P_1$ | $P_2$ | $P_3$ | $P_4$ | | | $P_5$ | | | | | |
| 2 | | $P_{21}$ | $P_{31}$ $P_{32}$ | $P_{41}$ $P_{42}$ $P_{43}$ | | | $P_{51}$ $P_{52}$ $P_{53}$ | | | $P_{54}$ | | |
| 3 | | | $P_{321}$ | $P_{421}$ $P_{431}$ $P_{432}$ | | | $P_{521}$ $P_{531}$ $P_{532}$ | | | $P_{541}$ $P_{542}$ $P_{543}$ | | |
| 4 | | | | $P_{4321}$ | | | | | | $P_{5432}$ | $P_{5421}$ $P_{5431}$ | $P_{5432}$ |
| 5 | | | | | | | | | | | | $P_{54321}$ |

STEP 0. According to Table 2, calculate $p_{ij}$, i=1, 2, ..., 6 and $l_i$=0, 1, ..., W($e_i$), Then, $Pr(P_1) = .3078$ where, $Pr(P_1) = Pr\{X | P_1 = (3, 2, 1, 0, 0, 1) \leq X\}$
$= p_{13} \cdot p_{22} \cdot p_{31} \cdot p_{40} \cdot p_{50} \cdot p_{61}$
$= .6 \cdot .6 \cdot .9 \cdot .95$
$= 0.3078$

STEP 1.

Let $i = 3$ $R_d = Pr(P_1) + [Pr(P_2) - Pr(P_{21})] = .46683$ where $[Pr(P_2) - Pr(P_{21})] = Pr(2, 2, 0, 0, 1, 1) - Pr(3, 2, 1, 0, 1, 1)]$
$= Pr(\|P_2, P_{21}\|) \cdot [Pr(P_2 / \|P_2, P_{21}\|) - Pr(P_{21} / \|P_2, P_{21}\|]$
$= Pr(\_, 2, \_, 0, 1, 1) \cdot [Pr(2, \_, 0, \_, \_, \_) - Pr(3, \_, 1, \_, \_, \_)]$
$= (p_{22} p_{40} p_{51} p_{61}) \cdot (p_{12} p_{30} - p_{13} p_{31})$
$= (p_{22} p_{51} p_{61}) \cdot (p_{12} - p_{13} p_{31})$.

STEP 1.
STEP 2. j=2, $D_{31}=\{P_3=(2,1,1,0,1,2)\}$,
$D_{32}=\{P_{31}=(3,2,1,0,1,2), P_{32}=(2,2,1,0,1,2)\}$.
STEP 3. Because $P_{32} < P_{31}, \Delta_{32}=\{P_{32}\}$
STEP 4. Because there is only one element and no elements correlated to each other in $\Delta_{32}$, move toward STEP 6.
STEP 6.

$$R_d = R_d + Pr(\Delta_3) = .46683 + [Pr(P_3) - Pr(P_{32})] \quad (34)$$
$= .46683 + [Pr(2, 1, 1, 0, 1, 2) - Pr(2, 2, 1, 0, 1, 2)]$
$= .46683 + Pr(\|P_3, P_{32}\|) \cdot [Pr(P_3 / \|P_3, P_{32}\|) - Pr(P_{32} / \|P_3, P_{32}\|)]$
$= .46683 + Pr(2, \_, 1, 0, 1, 2)$
$[Pr(\_, 1, \_, \_, \_, \_) - Pr(\_, 2, \_, \_, \_, \_)]$
$= .46683 + (.85 \cdot .9 \cdot .9 \cdot .7) \cdot (.9 - .6)$
$= .611415$.

STEP 7. Because i=3 is the number of the system-state vectors δ, the procedure is stopped.
Further description of STEP 5.
If there are correlated elements in $\Delta_{ij}$,
Let j=j+1, $D_{ij}=\{P_{Ikl}|$Intersection of the correlated elements $P_{Ik}, P_{Il}$ in $D_{i,j-1}$, k>l$\}$.
Next, move toward STEP 3.
In addition, if i<δ, Let i=i+1, i.e., Let i=4,j=2,$D_{41}=\{P_4\}$, $D_{42}=\{P_{41}, P_{42}, P_{43}\}$
Assume $P_{43}$ is the element having greater values, $P_{41}$ and $P_{42}$ are unable to be compared which one is greater, then check the elements in the next grade (j=j+1) except the elements correlated to $P_{43}$, i.e., $D_{43}=\{P_{421}\}$, and $\Delta_{43}=\{P_{421}\}$
Finally, the reliability of the multi-state flow network is $R_d=R_d+Pr(\Delta_4)$
where $$Pr(\Delta)=Pr(\|P_I,P_{Ijk}\|)\cdot\{Pr(P_I/\|P_I,P_{Ijk}\|)-Pr(P_{If}/\|P_I,P_{Ijk}\|)+Pr(P_{Ik}/\|P_I,P_{Ijk}\|)]+Pr(P_{Ijk}/\|P_I,P_{Ijk}\|)\}$$

$$Pr(\Delta_4)=Pr(\|P_4,P_{421}\|)\cdot\{Pr(P_4/\|P_4,P_{421}\|)-Pr(P_{42}/\|P_4,P_{421}\|)+Pr(P_{41}/\|P_4,P_{421}\|)]+Pr(P_{421}/\|P_4,P_{421}\|)\}$$

In summary, when calculating the reliability of the multi-state flow network, the present invention firstly compares the elements in the second grade of the system-state vector, so as to excluding the element with greater values and other related thereof in all grades in the system-state vector and use the GCF calculating means to execute all the calculation. Therefore, comparing to SDP technique, the present invention can reduce the number of summation and multiplication, so as to reduce the reliability calculation time and improve the calculation performance.

The above embodiments are merely used to describe the principle, characteristic, and effect according to the present invention, but not to limit the present invention. Anyone with ordinary skills in the arts can modify or change the above embodiments without departing from the spirit and scope of the disclosure. Any use according to the present invention complete disclosure and equivalent changes and modifications, all of the following claims should be covered. Accordingly, the scope according to the present invention should follow the appended claims.

What is claimed is:

1. A reliability evaluation system for a multi-state flow network that has a source node, a reception node, at least one connection node between the source node and the reception node, and a plurality of paths having a given flow upper limit from the source node, through the connection node, to the reception node, the reliability evaluation system performed using a computer coupled to a database including data relating to the multi-state flow network for reducing reliability calculation time, the reliability evaluation system comprising:

a processor defining, by the computer, each of the plurality of paths as a system state vector, each of the system state vectors having at least one grade, each of the grade having at least one element, so as to define all the elements in the $j^{th}$ grade of the $i^{th}$ system state vector as a set, wherein j is i−1;

a comparator comparing, by the computer, values of all the elements in the set, excluding the element with a greater value and other related thereof in all grades in the $i^{th}$ system-state vector when only one element in the set except the element with greater values so as to obtain remaining elements, or, when only one element is in the set, letting the element to be the remaining element; and a calculator using a great common factor (GCF) calculating, by the computer, means to calculate initial reliability based on a first system-state vector and a second system-state vector of the plurality of paths, and using the GCF calculating means to perform the calculation of the remaining element to obtain a calculation results, summing the initial reliability and the calculation results so as to obtain a reliability of the multi-state flow network.

2. The reliability evaluation system according to claim 1, wherein the processor modifies the definition of the set to all the elements in the $j+1^{th}$ grade of the $i^{th}$ system state vector, when the element with the greater value is unable to be obtained from the set.

3. The reliability evaluation system according to claim 1, wherein the processor modifies the definition of the set to all the other elements except the element with the greater value and other related thereof in the $j+1^{th}$ grade of the $i^{th}$ system-state vector when there are more than one elements except the element with the greater value.

4. The reliability evaluation system according to claim 1, wherein the processor replaces i to 1+1 and modifies definition of the set to all the elements in the $j^{th}$ grade of the $i+1^{th}$ system state vector, when i is smaller than the number of the plurality of paths, and the comparator generates other remaining elements based on the modified set, and the calculator calculates another calculation result, then the reliability of the multi-state flow network is the summation of the initial reliability, the calculation result and the another calculation result.

5. The reliability evaluation system according to claim 1, wherein the calculator calculates the probability of the first system state vector, and calculates the result of probability of the second system state vector minus probability of the intersection of the first system state vector and the second system state vector by the GCF calculating means, so as to obtain an initial calculation result, and then obtains the initial reliability by summing the probability of the first system state vector and the initial calculation result.

6. A reliability evaluation method for a multi-state flow network that has a source node, a reception node, at least one connection node between the source node and the reception node, and a plurality of paths having a given flow upper limit from the source node, through the connection node, to the reception node, the reliability evaluation method being performed for reducing reliability calculation time and comprising the following steps of:

(1) defining each of the plurality of paths as a system state vector, and using a GCF calculating means to calculate an initial reliability based on a first system-state vector and a second system-state vector of the plurality of paths;

(2) each of the system state vector having at least one grade, each of the grade having at least one element, so as to define all the elements in the $j^{th}$ grade of the $i^{th}$ system state vector as a set, wherein j is i−1;

(3) comparing values of all the elements in the set;

(4) excluding the element with a greater value and other related thereof in all grades in the $i^{th}$ system-state vector when only one element in the set except the element with the greater value so as to obtain remaining elements, or, when only one element is in the set, letting the element to be the remaining element; and (5) using the GCF calculating means to perform the calculation of the remaining element to obtain a calculation results, summing the initial reliability and the calculation results so as to obtain a reliability of the multi-state flow network.

7. The reliability evaluation method according to claim 6, wherein, after step (3), if the element having the greater value in the set is not obtained, modifying the definition of the set to all the elements in the $j+1^{th}$ grade of the $i^{th}$ system state vector, and then executing step (3) to step (5) again.

8. The reliability evaluation method according to claim 6, wherein, after step (3), if there are more than one elements except the element with the greater value in the set, modifying the definition of the set to all the other elements except the element with the greater value and other related thereof in the $j+1^{th}$ grade of the $i^{th}$ system-state vector, and then executing step (3) to step (5) again.

9. The reliability evaluation method according to claim 6, wherein, after executing step (1) to step (5), replacing i to i+1 and modifying definition of the set to all the elements in the $j^{th}$ grade of the $i+1^{th}$ system state vector, when i is smaller than the number of the plurality of paths, and returning to step (3) to step (5) to calculate another calculation result, then the reliability of the multi-state flow network is the summation of the initial reliability, the calculation result and the another calculation result.

10. The reliability evaluation method according to claim 6, wherein step (1) comprises:
   (1-1) calculating the probability of the first system state vector;
   (1-2) calculating the result of probability of the second system state vector minus probability of the intersection of the first system state vector and the second system state vector by the GCF calculating means, so as to obtain an initial calculation result;
   (1-3) calculating the summation of the probability of the first system state vector and the initial calculation result, so as to obtain the initial reliability.

* * * * *